United States Patent
Rogers et al.

(10) Patent No.: US 10,465,546 B2
(45) Date of Patent: Nov. 5, 2019

(54) BRUSH SEAL WITH EXTENDED BACKING PLATE

(71) Applicant: UNITED TECHNOLOGIES CORPORATION, Farmington, CT (US)

(72) Inventors: Mark J. Rogers, Kennebunk, ME (US); Timothy M. Davis, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 194 days.

(21) Appl. No.: 15/687,900

(22) Filed: Aug. 28, 2017

(65) Prior Publication Data
US 2019/0063248 A1  Feb. 28, 2019

(51) Int. Cl.
*F01D 11/00* (2006.01)
*F16J 15/3288* (2016.01)

(52) U.S. Cl.
CPC .......... *F01D 11/006* (2013.01); *F01D 11/005* (2013.01); *F16J 15/3288* (2013.01); *F05D 2240/56* (2013.01)

(58) Field of Classification Search
CPC .... F01D 11/005; F01D 11/006; F01D 25/236; F16J 15/3288; F05D 2240/11; F05D 2240/56; F02C 7/28
See application file for complete search history.

(56) References Cited

U.S. PATENT DOCUMENTS

| | | | | |
|---|---|---|---|---|
| 5,201,530 A * | 4/1993 | Kelch | ................... | F16J 15/3288 277/355 |
| 5,328,328 A * | 7/1994 | Charbonnel | .......... | F01D 11/001 415/160 |
| 5,480,165 A * | 1/1996 | Flower | ................. | F16J 15/3288 277/355 |
| 5,704,760 A * | 1/1998 | Bouchard | ............. | F01D 11/001 277/355 |
| 5,848,874 A | 12/1998 | Heumann et al. | | |
| 6,357,752 B1 | 3/2002 | Lampes | | |
| 6,622,490 B2 * | 9/2003 | Ingistov | ................ | F01D 11/001 277/355 |
| 7,438,526 B2 | 10/2008 | Enderby | | |
| 7,461,847 B2 | 12/2008 | Short et al. | | |
| 8,657,298 B2 * | 2/2014 | Zheng | ................... | F16J 15/3288 277/355 |

(Continued)

FOREIGN PATENT DOCUMENTS

| | | |
|---|---|---|
| EP | 1394362 | 3/2004 |
| EP | 3081762 | 10/2016 |

OTHER PUBLICATIONS

European Patent Office, European Search Report dated Jan. 29, 2019 in Application No. 18191285.8.

*Primary Examiner* — Igor Kershteyn
(74) *Attorney, Agent, or Firm* — Snell & Wilmer, L.L.P.

(57) ABSTRACT

A seal system may comprise a seal cavity defined, at least partially, by a first axial surface and a second axial surface. The second axial surface may be recessed with respect to the first axial surface. A brush seal may be disposed in the seal cavity. The brush seal may comprise a first bristle pack and a backing plate coupled to the first bristle pack. A first group of bristles of the first bristle pack may be radially inward of the first axial surface.

17 Claims, 4 Drawing Sheets

(56) References Cited

U.S. PATENT DOCUMENTS

| | | | |
|---|---|---|---|
| 2005/0006851 A1* | 1/2005 | Addis | F16J 15/3288 |
| | | | 277/355 |
| 2015/0226132 A1* | 8/2015 | Roy Thill | F16J 15/0887 |
| | | | 415/183 |
| 2016/0298475 A1* | 10/2016 | Tatman | F01D 11/005 |
| 2016/0312637 A1 | 10/2016 | Duguay | |

* cited by examiner

BRUSH SEAL WITH EXTENDED BACKING PLATE

FIELD

The present disclosure relates to seal structures, and, more specifically, to a seal structure for a gas turbine engine.

BACKGROUND

A gas turbine engine typically includes a fan section, a compressor section, a combustor section, and a turbine section. Air moves into the engine through the fan section. Airfoil arrays in the compressor section rotate to compress the air, which is then mixed with fuel and combusted in the combustor section. The products of combustion are expanded to rotatably drive airfoil arrays in the turbine section. Rotating the airfoil arrays in the turbine section drives rotation of the fan and compressor sections.

The gas turbine engine may have various gas-flow streams that may be kept separate from one another by various components and/or seals. Brush seals may be employed in applications where the seal cavity, within which the brush seal is located, expands and contracts axially due to translation and/or thermal expansion of the components that define the seal cavity. Brush seals may also be employed in applications where there is a high pressure differential between the various gas-flow streams. However, in applications challenged by both axial expansion/contraction and high pressure differentials, current brush seal designs tend to experience difficulties, as brush seals with large backing plate gaps are generally needed for active seal cavities (i.e., seal cavities that experience expansion and contraction) to prevent the backing plate from contacting the axial surfaces of the seal cavity. However, in high pressure differential applications, large backing plate gaps tend to lead to increased bristle blow-over, which may lead to leakage at the sealing interface.

SUMMARY

A seal is disclosed herein, in accordance with various embodiments. The seal system may comprise a seal cavity defined, at least partially, by a first axial surface and a second axial surface recessed with respect to the first axial surface. A brush seal may be disposed in the seal cavity. The brush seal may comprise a first bristle pack and a backing plate coupled to the bristle pack. A first group of bristles of the bristle pack may be radially inward of the first axial surface of the vane.

In various embodiments, a second group of bristles of the first bristle pack may contact the first axial surface. The second group of bristles of the first bristle pack may be radially outward of the first group of bristles of the first bristle pack. The first group of bristles may extend axially beyond the first axial surface. A portion of the first group of bristles may be located between the backing plate and a radial surface extending between the first axial surface and the second axial surface.

In various embodiments, the brush seal may further comprise a second bristle pack radially outward of the first bristle pack. The first bristle pack may comprise a first bristle density and the second bristle pack may comprise a second bristle density greater than the first bristle density. A distance extending from an end of the first group of bristles to a surface of the backing plate may be less than or equal to 0.015 inches.

In various embodiments, the seal cavity may be defined, at least partially, by a vane and a blade outer air seal (BOAS). The vane may comprise the first axial surface and the second axial surface. The first group of bristles may be configured to absorb a radial load generated by radial translation of at least one of the vane or the BOAS. A first bristle density of the first bristle pack proximate the first axial surface may be less than a second bristle density of the first bristle pack distal the first axial surface.

A seal system for a gas turbine engine is disclosed, in accordance with various embodiments. The seal system may comprise a vane and a static structure adjacent to the vane. A brush seal may be disposed in a seal cavity defined, at least partially, by the static structure, a first axial surface of the vane, and a second axial of the vane recessed from the first axial surface of the vane. The brush seal may comprise a first bristle pack and a backing plate coupled to the first bristle pack.

In various embodiments, a first group of bristles of the first bristle pack may be radially inward of the first axial surface of the vane. A second group of bristles of the first bristle pack may contact the first axial surface. The second group of bristles of the first bristle pack may be radially outward of the first group of bristles of the first bristle pack. A portion of the first group of bristles may be located between the backing plate and a radial surface extending axially from the first axial surface of the vane. The first group of bristles may be configured to absorb a radial load generated by radial translation of at least one of the vane or the static structure.

In various embodiments, the brush seal may further comprise a second bristle pack located radially outward of the first bristle pack. The first bristle pack may comprise a first bristle density that is less than a second bristle density of the second bristle pack. In various embodiments, the static structure may comprise a BOAS.

A method of making a seal system is disclosed, in accordance with various embodiments. The method may comprise forming a seal cavity defined at least partially by a first static structure and a second static structure adjacent the first static structure, and disposing a brush seal in the seal cavity. The first static structure may comprise a first axial surface and a second axial surface recessed with respect to the first axial surface.

In various embodiments, as an axial distance between the first static structure and the second static structure decreases a first group of bristles of the brush seal will contact the first axial surface and a second group of bristles of the brush seal will be located radially inward of the first axial surface and extend axially beyond the first axial surface of the first static structure.

In various embodiments, the method may further comprise forming the second axial surface by removing a portion of the first static structure from the first axial surface of the first static structure. In various embodiments, the first static structure may comprise a vane and the second static structure may comprise a BOAS.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion

DETAILED DESCRIPTION

Figure 1:
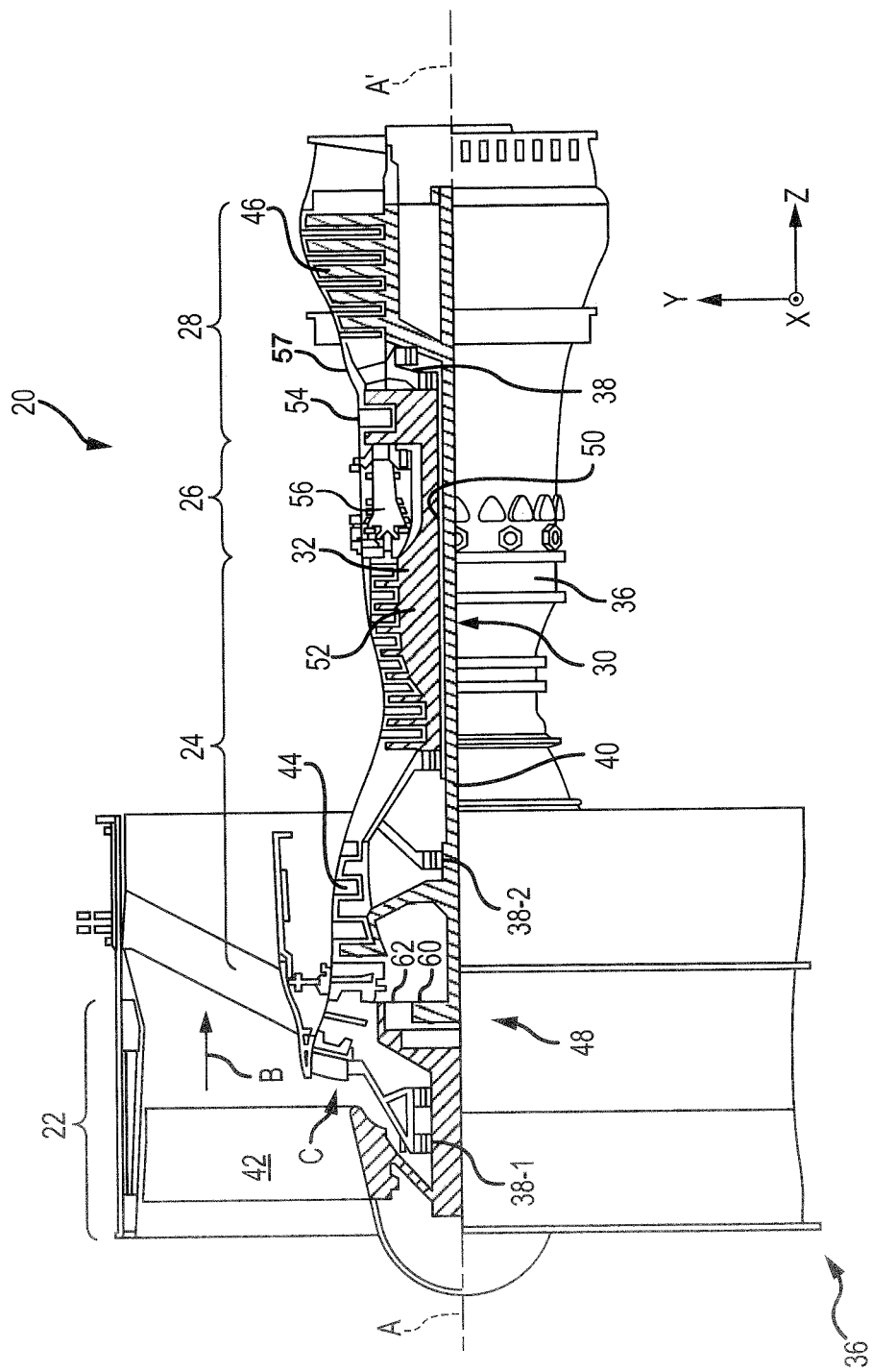
FIG. 1 illustrates an exemplary gas turbine engine, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "distal" refers to the direction outward, or generally, away from a reference component. As used herein, "proximate" refers to a direction inwards, or generally, towards the reference component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

Seal system as disclosed herein may comprise a brush seal located between two static structures, for example, between a vane and a blade outer air seal (BOAS). The brush seal may comprise a backing plate that is extended axially to minimize the distance between the end of the backing plate and the ends of the bristles of the brush seal. The extended backing plate supports the bristles and minimizes or eliminates bristle blow-over at high pressure differentials. The brush seal may be disposed in a seal cavity defined, at least partially, by a first axial surface and a second axial surface that is recessed with respect to the first axial surface. As a distance between the first static structure and the second static structure decreases, the recessed axial surface tends to prevent the extended backing plate from contacting the sealing surface.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a path of bypass airflow B while compressor section 24 can drive fluid along a path of core airflow C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures, as well as industrial gas turbines.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided x-y-z axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of fan 42 may be significantly larger than that of low pressure compressor 44, and low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, or may comprise any gas turbine engine as desired.

Low pressure compressor 44, high pressure compressor 52, low pressure turbine 46, and high pressure turbine 54 may comprise one or more stages or sets of rotating blades and one or more stages or sets of stationary vanes axially interspersed with the associated blade stages but non-rotating about engine central longitudinal axis A-A'.

Figure 2:
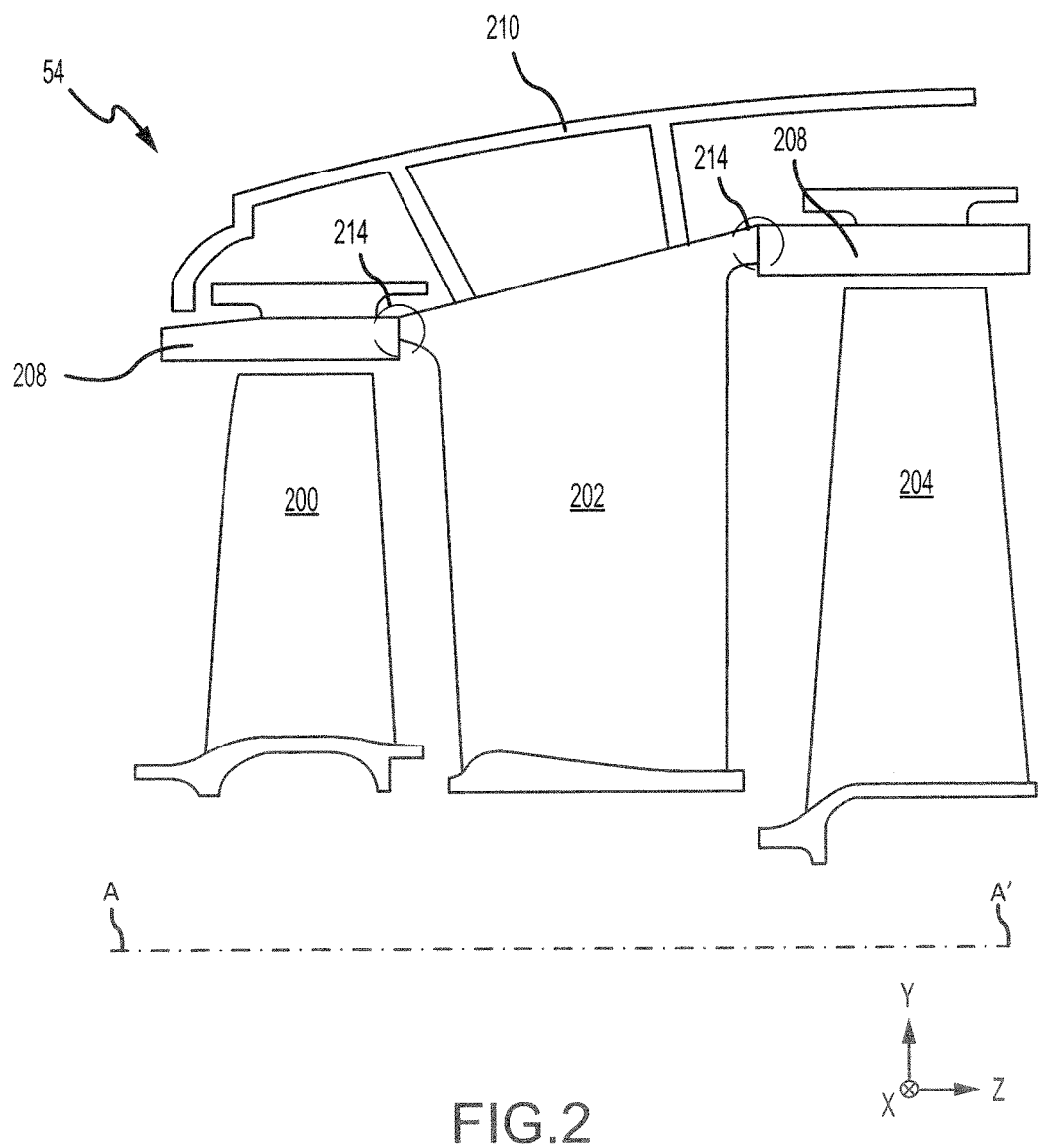
FIG. 2 illustrates a schematic cross-section of a portion of a high pressure turbine section of the gas turbine engine of FIG. 1, in accordance with various embodiments.

With reference to FIG. 2, a portion of high pressure turbine 54 is illustrated, in accordance with various embodiments. High pressure turbine 54 may include a first rotating member or blade 200, a non-rotating member or vane 202, and a second rotating member or blade 204. First blade 200 and second blade 204 may each be configured to rotate about engine central longitudinal axis A-A', in response to receiving a flow of fluid (e.g., air) from combustor section 26 (FIG. 1). Power from the flow may be converted to mechanical power, or torque, by first blade 200 and second blade 204. Vane 202 may be coupled to a frame 210, casing, or other support structure of high pressure turbine 54. Vane 202 may help direct the flow of fluid between first blade 200 and second blade 204. Vane 202 may comprise a static structure that does not rotate relative to engine central longitudinal axis A-A'.

A BOAS 208 may be located radially outward from each of first blade 200 and second blade 204. BOAS 208 may be a static structure (i.e., a structure that does not rotate about engine central longitudinal axis A-A') designed to function as a seal to reduce air leakage over the radially outward portions, or "tips," of blades 200 and 204. To reduce leakage of air between BOAS 208 and vane 202, seal systems 214 may be located between vane 202 and BOAS 208. Although the present disclosure is directed to providing seal systems between a BOAS and a vane in high pressure turbine 54, one skilled in the art will realize that the seal system disclosed herein may be equally applicable to low pressure turbine 46, high pressure compressor 52, low pressure compressor 44, and/or other areas of gas turbine engine 20 (FIG. 1) where a seal is desired.

Figure 3A:
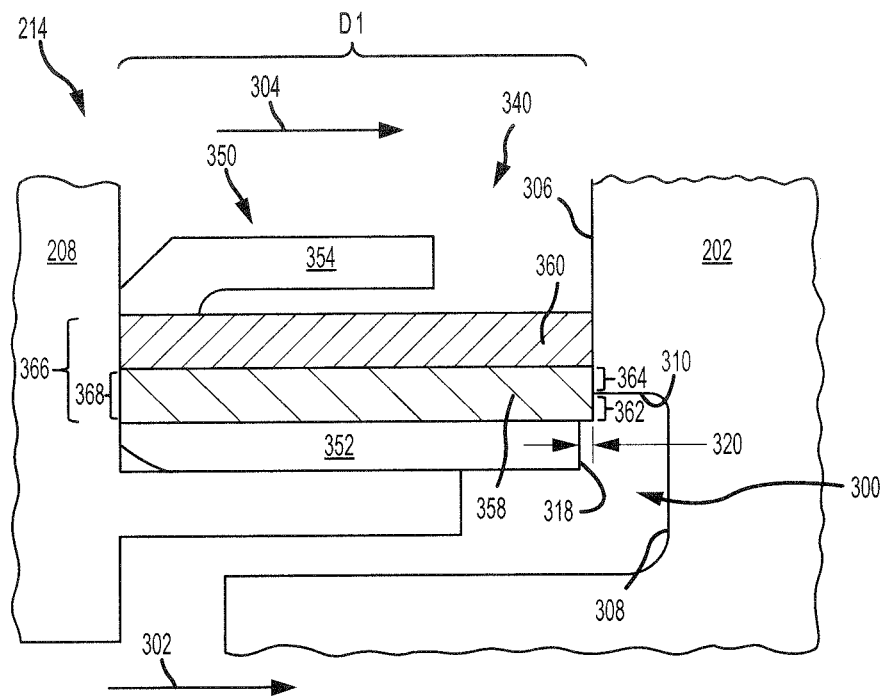
FIG. 3A illustrates a seal system with the seal cavity in an open state, in accordance with various embodiments.

With reference to FIG. 3A, a seal system 214 comprising a brush seal 350 is shown, in accordance with various embodiments. In various embodiments, brush seal 350 may be an annular split ring seal centered about axis of rotation A-A' (FIG. 2). Brush seal 350 may be configured to seal an airflow 302 over vane 202 (e.g., core flowpath C of FIG. 1) from an airflow 304 on the opposite or radially outward side of brush seal 350.

Brush seal 350 may comprise a first bristle pack 358. A first group of bristles 362 of first bristle pack 358 may be located radially inward of first axial surface 306. A second group of bristles 364 of first bristle pack 358 may contact first axial surface 306 of vane 202. In various embodiments, first bristle pack 358 may comprise bristles of varying diameter and/or bristles that lay at varying angles relative to axis of rotation A-A' (FIG. 1). In various embodiments, brush seal 350 may include a second bristle pack 360. Second bristle pack may be disposed radially outward of first bristle pack 358. In various embodiments, first bristle pack 358 and/or second bristle pack 360 may comprise bristles of varying diameter and/or bristles that lay at varying angles relative to axis of rotation A-A' (FIG. 1).

Brush seal 350 may further include a backing plate 352. Backing plate 352 may be coupled to first bristle pack 358 and second bristle pack 360. Backing plate 352 may be disposed radially inward of first bristle pack 358. Backing plate 352 may be made from a metal or metal alloy. For example, backing plate may comprise aluminum, copper, nickel, cobalt, titanium, steel, and/or alloys thereof.

Brush seal 350 may further include a retention structure 354 disposed radially outward of bristle packs 358 and 360. In various embodiments, retention structure 354, bristle packs 358 and 360, and backing plate 352 may be welded together. In various embodiments, retention structure 354, bristle packs 358 and 360, and backing plate 352 may be welded or joined at end of brush seal 350 that is distal to the sealing interface. Stated differently, the weld joining retention structure 354, bristle packs 358 and 360, and backing plate 352 may be located generally opposite the ends of bristle packs 358 and 360 that form the sealing interface (i.e., contact) along first axial surface 306. Electron-beam (e-beam) welding may be used to form the joint or weld between backing plate 352, bristle packs 358 and 360, and retention structure 354. E-beam welding is done by applying a beam of electrons to materials to be joined. The materials may melt and bond together in response to the beam. The weld may be formed continuously around brush seal 350.

Brush seal 350 may be disposed in a seal cavity 340. Seal cavity 340 may be defined, at least partially, by BOAS 208 and vane 202. Seal cavity 340 may include a recessed area 300. Recessed area 300 may be formed in vane 202. Recessed area 300 may be defined, at least partially, by a second axial surface 308 of vane 202 and a radial surface 310 of vane 202. Second axial surface 308 may be recessed, or axially offset, with respect to first axial surface 306. Radial surface 310 may extend axially from first axial surface 306 to second axial surface 308. In various embodiments, recessed area 300 may be formed by machining vane 202. Stated differently, in various embodiments, recessed area 300 may be formed by removing a portion of vane 202 from first axial surface 306. In various embodiments, recessed area 300 may be formed during a casting of vane 202.

In FIG. 3A, seal cavity 340 is shown in an "open" state such that an axial distance D1 between BOAS 208 and vane 202 is at a maximum. Brush seal 350 is configured such that first bristle pack 358 and/or second bristle pack 360 will contact first axial surface 306 in the open state and form a sealed interface. Various operating conditions of engine 20 (FIG. 1), for example, take-off, cruise, landing, etc., may cause seal cavity 340 to "close" such that the axial distance between BOAS 208 and vane 202 decreases. For example, thermal expansion and/or axial translation of BOAS 208 and/or vane 202 may decrease the axial distance between BOAS 208 and vane 202.

Figure 3B:
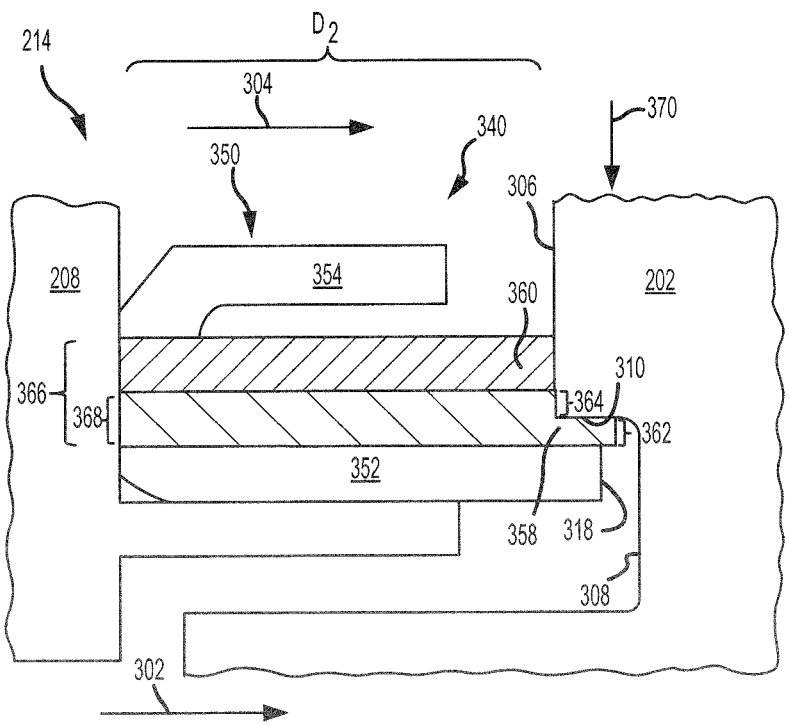
FIG. 3B illustrates a seal system with the seal cavity in a closed state, in accordance with various embodiments.

With reference to FIG. 3B, seal cavity 340 is shown in a "closed" state such that an axial distance D2 between BOAS 208 and vane 202 is less than the maximum axial distance D1 (FIG. 3A). In various embodiments, BOAS 208 and vane 202 may also translate radially relative to one another. Brush seal 350 may be configured to accommodate such radial translation of BOAS 208 and/or vane 202. In that regard, a combined radial thickness 366 of first bristle pack 358 and second bristle pack 360 may be selected such that, at a maximum radially outward translation of vane 202 and a maximum radially inward translation of BOAS 208, a portion of second bristle pack 360 remains in contact with first axial surface 306. The combined radial thickness 366 of first bristle pack 358 and second bristle pack 360 may also be selected such that, at a maximum radially inward translation of vane 202 and a maximum radially outward translation of BOAS 208, a portion of first bristle pack 358 (e.g., bristles 362) remains radially inward of first axial surface 306 of vane 202.

In various embodiments, a radial thickness 368 of first bristle pack 358 may be selected such that, at a maximum radially outward translation of vane 202 and a maximum radially inward translation of BOAS 208, a portion of first bristle pack 358 (e.g., bristles 364) remains in contact with first axial surface 306. The radial thickness 368 of first bristle pack 358 may also be selected such that, at a maximum radially inward translation of vane 202 and a maximum radially outward translation of BOAS 208, a portion of first bristle pack 358 (e.g., bristles 362) remains radially inward of first axial surface 306.

With combined reference to FIGS. 3A and 3B, the first group of bristles 362 remaining radially inward of first axial surface 306 may cause the first group of bristles 362 to be radially overlapped by first axial surface 306, when seal cavity 340 is in the closed state (i.e., when axial distance D2 is less than maximum axial distance D1). Stated differently, as the axial distance between vane 202 and BOAS 208 decreases, a first group of uncompressed bristles (e.g., bristles 362) extends axially beyond first axial surface 306, and a second group of bristles (e.g., bristles 364 and/or second bristle pack 360) contacts first axial surface 306 and compresses. Stated yet another way, as the axial distance between vane 202 and BOAS 208 decreases, a first group of bristles (e.g., bristles 362) is sandwiched between radial surface 310 and backing plate 352, and a second group of bristles (e.g., bristles 364) contacts first axial surface 306 and compresses.

In various embodiments, the bristles of first bristle pack 358 may be flared such that a bristle density (i.e., the number of bristles per unit area of the bristle pack) of first bristle pack 358 proximate first axial surface 306 is less than a bristle density of first bristle pack 358 distal first axial surface 306. For example, the area of first bristle pack 358 proximate first axial surface 306 may comprise a bristle density of 1800 bristles per square inch (i.e., per 6.54 cm$^2$), and the area of first bristle pack 358 distal first axial surface 306 may comprise a bristle density of 2200 bristles per square 1.0 inch (i.e., per 6.54 cm$^2$). The decreased bristle density proximate to first axial surface 306 (i.e., the flaring of the bristle ends proximate first axial surface 306) may allow the bristles that are radially overlapped by first axial surface 306 (e.g., bristles 362) to absorb a radial inward load 370 generated by radially inward translation (e.g., thermal expansion or radial movement) of vane 202. The first group of bristles 362 absorbing load 370 tends to decrease or prevent load 370 from being transferred to BOAS 208.

In various embodiments, as the distance between vane 202 and BOAS 208 decreases, the bristles that contact first axial surface 306 (e.g., the second group of bristles 364 and/or the bristles of second bristle pack 360) tend to become more densely packed as compared to the bristles that are radially inward of radial surface 310 (e.g., the first group of bristles 362). For example, while the flare of the radially inward group of bristles is comparable to the flare of the bristles contacting first axial surface 306, the radially inward group of bristles tend to be less densely packed because the bristles in the radially inward group of bristles are not being axially compressed into a smaller space. However, as vane 202 moves radially inward, the density of the radially inward bristles may increase due to the bristles being compressed radially into a smaller space. In both situations, the flare of the bristles tends to enable the bristles to absorb, or not transmit much if any of, the load caused by the translation of vane 202.

In various embodiments, a bristle density of second bristle pack 360 may be greater than the bristle density of first bristle pack 358. The difference in bristle density between first bristle pack 358 and second bristle pack 360 allows for a decreased bristle density radially inward of first axial surface 306 to facilitate absorption of load 370 and an increased bristle density in contact with first axial surface 306 to decrease fluid leakage across the sealing interface.

The bristles of first bristle pack 358 and second bristle pack 360 may overhang (i.e., extend past) a surface 318 of backing plate 352. In various embodiments, surface 318 of backing plate 352 may be oriented toward second axial surface 308. Second axial surface 308 of vane 202 being recessed with respect to first axial surface 306 may allow an axial overhang length 320 (FIG. 3A) of the bristle packs to be decreased, as backing plate 352 may be extended axially without contacting the sealing surface (i.e., first axial surface 306). Recessed area 300 may be configured such that, when the axial distance between vane 202 and BOAS 208 is at a minimum, backing plate 352 will not contact second axial surface 308. Stated another way, an axial length of radial surface 310 may be selected to prevent backing plate 352 from contacting second axial surface 308. In various embodiments, length 320 may be less than or equal to 0.040 inches (0.102 cm). In various embodiments, length 320 may be less than or equal to 0.015 inches (0.038 cm). In various embodiments, length 320 may be less than 0.008 inches (0.020 cm).

Decreasing the overhang length 320 of bristle packs 358 and 360 may reduce bristle deflection, as the unsupported length of the bristles is reduced as compared to brush seals with larger overhang lengths. The reduction in unsupported bristle overhang tends to limit bristle deflection caused by the pressure differential between airflow 302 and airflow 304. Limiting bristle deflection may reduce distortion of brush seal 350 and decrease a likelihood of leakage across the sealing interface.

Figure 4:
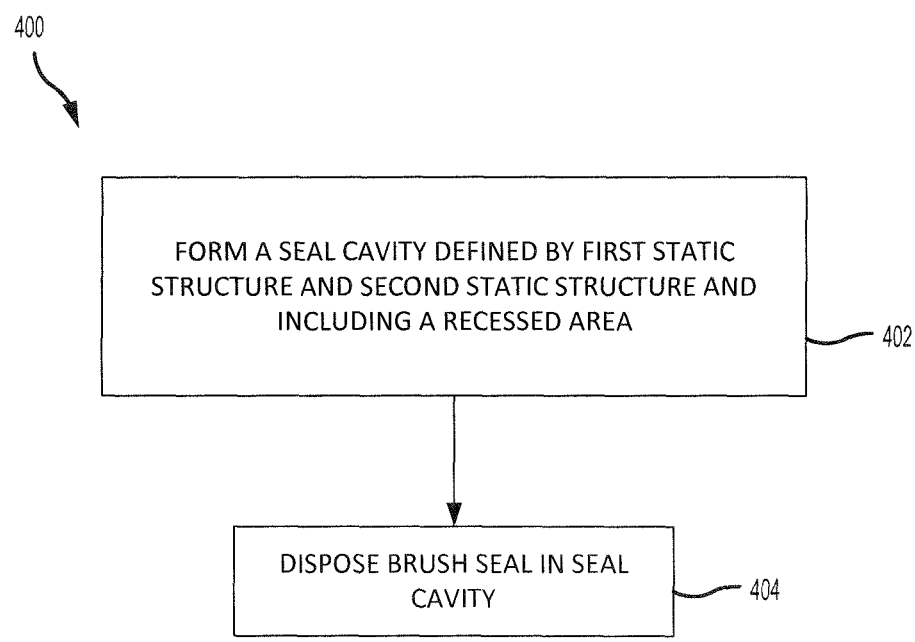
FIG. 4 illustrates a method of making a seal system, in accordance with various embodiments.

With reference to FIG. 4, a method 400 of making a seal system is shown, in accordance with various embodiments. Method 400 may comprise forming a seal cavity defined at least partially by a first static structure and a second static structure adjacent the first static structure and including a recessed area (step 402), and disposing a brush seal in the seal cavity (step 404).

In various embodiments, as an axial distance between the first static structure and the second static structure decreases, a first group of bristles of the brush seal may contact the first axial surface and a second group of bristles of the brush seal may be radially overlapped by the first axial surface. In various embodiments, the recessed area may be formed by removing a portion of the first static structure from the first axial surface. In various embodiments, the first static structure may comprise a vane and the second static structure may comprise a BOAS.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal system, comprising:
    a seal cavity defined, at least partially, by a first axial surface and a second axial surface, wherein the second axial surface is recessed with respect to the first axial surface; and
    a brush seal disposed in the seal cavity, the brush seal comprising:
        a first bristle pack, wherein a first group of bristles of the first bristle pack is radially inward of the first axial surface and a second group of bristles of the first bristle pack contacts the first axial surface, and wherein the second group of bristles of the first bristle pack is radially outward of the first group of bristles of the first bristle pack, and
        a backing plate coupled to the first bristle pack.

2. The seal system of claim 1, wherein the first axial surface radially overlaps the first group of bristles.

3. The seal system of claim 2, wherein the first group of bristles is located between the backing plate and a radial surface extending between the first axial surface and the second axial surface.

4. The seal system of claim 1, wherein the brush seal further comprises a second bristle pack radially outward of the first bristle pack.

5. The seal system of claim 4, wherein the first bristle pack comprises a first bristle density and the second bristle pack comprises a second bristle density greater than the first bristle density.

6. The seal system of claim 1, wherein a distance extending from an end of the first group of bristles to a surface of the backing plate is less than or equal to 0.015 inches.

7. The seal system of claim 1, wherein the seal cavity is defined, at least partially, by a vane and a blade outer air seal (BOAS), the vane comprising the first axial surface and the second axial surface.

8. The seal system of claim 7, wherein the first group of bristles is configured to absorb a radial load generated by radial translation of at least one of the vane or the BOAS.

9. The seal system of claim 8, wherein a first bristle density of the first bristle pack proximate the first axial surface is less than a second bristle density of the first bristle pack distal the first axial surface.

10. A seal system for a gas turbine engine, comprising:
    a vane;
    a static structure adjacent to the vane; and
    a brush seal disposed in a seal cavity defined at least partially by the static structure, a first axial surface of the vane, and a second axial of the vane recessed from the first axial surface of the vane, the brush seal comprising:
        a first bristle pack, wherein a first group of bristles of the first bristle pack is radially inward of the first axial surface of the vane and a second group of bristles of the first bristle pack contacts the first axial surface, and wherein the second group of bristles of the first bristle pack is radially outward of the first group of bristles of the first bristle pack, and
        a backing plate coupled to the first bristle pack.

11. The seal system of claim 10, wherein a portion of the first group of bristles is located between the backing plate and a radial surface extending axially from the first axial surface of the vane.

12. The seal system of claim 10, wherein the first group of bristles is configured to absorb a radial load generated by radial translation of at least one of the vane or the static structure.

13. The seal system of claim 10, wherein the brush seal further comprises a second bristle pack located radially outward of the first bristle pack, and wherein the first bristle pack comprises a first bristle density that is less than a second bristle density of the second bristle pack.

14. The seal system of claim 10, wherein the static structure comprises a blade outer air seal.

15. A method of making a seal system, comprising:
forming a seal cavity defined at least partially by a first static structure and a second static structure adjacent the first static structure, the seal cavity comprising a recessed area defined at least partially by a first axial surface of the first static structure and a second axial surface of the first static structure; solitude disposing a brush seal in the seal cavity; and configuring the brush seal within the seal cavity such that as an axial distance between the first static structure and the second static structure decreases, a first group of bristles of the brush seal contacts the first axial surface and a second group of bristles of the brush seal is radially overlapped by the first axial surface of the first static structure.

16. The method of claim 15, further including forming the recessed area by removing a portion of the first static structure from the first axial surface of the first static structure.

17. The method of claim 15, wherein the first static structure comprises a vane and the second static structure comprises a blade outer air seal.

* * * * *